(12) United States Patent
Kamel et al.

(10) Patent No.: US 12,208,756 B2
(45) Date of Patent: Jan. 28, 2025

(54) MANAGING CURRENT OR VOLTAGE IN LOW VOLTAGE BUSES OF VEHICLES

(71) Applicant: GM Global Technology Operations LLC, Detroit, MI (US)

(72) Inventors: Mohamed Kamel, Rochester, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 18/166,988

(22) Filed: Feb. 9, 2023

(65) Prior Publication Data

US 2024/0270187 A1 Aug. 15, 2024

(51) Int. Cl.
*B60R 16/033* (2006.01)

(52) U.S. Cl.
CPC .................. *B60R 16/033* (2013.01)

(58) Field of Classification Search
CPC .................................................. B60R 16/033
See application file for complete search history.

(56) References Cited

U.S. PATENT DOCUMENTS

| | | | |
|---|---|---|---|
| 8,115,446 B2 | 2/2012 | Piccard et al. | |
| 10,131,245 B2 | 11/2018 | Hand, III et al. | |
| 10,298,026 B2 | 5/2019 | Trimboli et al. | |
| 10,804,809 B1 | 10/2020 | Yelaverthi et al. | |
| 2018/0105058 A1* | 4/2018 | Symanow | B60L 58/13 |
| 2024/0131935 A1* | 4/2024 | Chen | G07C 5/0825 |
| 2024/0239235 A1* | 7/2024 | Ahmed | B60L 58/12 |
| 2024/0262247 A1* | 8/2024 | Bandyopadhyay | H02S 40/38 |

OTHER PUBLICATIONS

Evzelman et al.; "Active Balancing System for Electric Vehicles With Incorporated Low-Voltage Bus"; IEEE Transactions on Power Electronics; vol. 31, Issue 11; Nov. 2016; pp. 7887-7895.
Preindl; "A Battery Balancing Auxiliary Power Module With Predictive Control for Electrified Transportation"; IEEE Transactions on Industrial Electronics; vol. 65, Issue 8; Aug. 2018; pp. 6552-6559.
Zhang et al.; "Hybrid Balancing in a Modular Battery Management System for Electric-Drive Vehicles"; 2017 IEEE Energy Conversion Congress and Exposition (ECCE); Nov. 7, 2017; 6 Pages.

\* cited by examiner

*Primary Examiner* — Jared Fureman
*Assistant Examiner* — Duc M Pham
(74) *Attorney, Agent, or Firm* — CANTOR COLBURN LLP (57) ABSTRACT

Examples described herein provide a method for managing current in a low voltage bus of a vehicle. The method includes receiving an electrical load request for an electrical load of the vehicle. The method further includes, prior to enabling the electrical load, adjusting a current provided by a direct current (DC)/DC converter for a period of time based at least in part on the electrical load. The method further includes, responsive to expiration of the period of time, enabling or disabling the electrical load based at least in part on the electrical load request.

20 Claims, 6 Drawing Sheets

MANAGING CURRENT OR VOLTAGE IN LOW VOLTAGE BUSES OF VEHICLES

INTRODUCTION

Embodiments described herein generally relate to vehicles, and more specifically, to managing current or voltage in low voltage buses of vehicles.

Modern vehicles (e.g., a car, a motorcycle, a boat, or any other type of automobile) may be equipped with one or more batteries and/or generators to provide electric power to electrical loads. Examples of electrical loads include electric motors, lights, infotainment equipment, electronic control units, climate control systems, and/or the like, including combinations and/or multiples thereof. The electrical loads can be connected to the one or more batteries and/or generators via a wiring harness.

SUMMARY

In one exemplary embodiment, a method for managing current in a low voltage bus of a vehicle is provided. The method includes receiving an electrical load request for an electrical load of the vehicle. The method further includes, prior to enabling the electrical load, adjusting a current provided by a direct current (DC)/DC converter for a period of time based at least in part on the electrical load. The method further includes, responsive to expiration of the period of time, enabling or disabling the electrical load based at least in part on the electrical load request.

In addition to one or more of the features described herein, or as an alternative, further embodiments of the method may include that the electrical load request is a request to enable the electrical load, and wherein adjusting the current provided by the DC/DC converter comprises increasing the current for the period of time prior to enabling the electrical load.

In addition to one or more of the features described herein, or as an alternative, further embodiments of the method may include that the current is increased based at least in part on a minimum voltage threshold.

In addition to one or more of the features described herein, or as an alternative, further embodiments of the method may include that the electrical load request is a request to disable the electrical load, and wherein adjusting the current provided by the DC/DC converter comprises decreasing the current for the period of time prior to disabling the electrical load.

In addition to one or more of the features described herein, or as an alternative, further embodiments of the method may include that the current is decreased based at least in part on a maximum voltage threshold.

In addition to one or more of the features described herein, or as an alternative, further embodiments of the method may include that at least one DC/DC converter converts an electrical power from substantially 100 volts, substantially 250 volts, substantially 400 volts, substantially 500 volts, substantially 650 volts, substantially 800 volts, or substantially 1000 to substantially 12 volts or substantially 48 volts.

In addition to one or more of the features described herein, or as an alternative, further embodiments of the method may include that the electrical load request is triggered based at least in part on sensor data received from a sensor of the vehicle.

In addition to one or more of the features described herein, or as an alternative, further embodiments of the method may include that the electrical load request is triggered based at least in part on sensor data received from a sensor of another vehicle.

In addition to one or more of the features described herein, or as an alternative, further embodiments of the method may include that the DC/DC converter comprises a plurality of DC/DC converters.

In addition to one or more of the features described herein, or as an alternative, further embodiments of the method may include that the period of time is a regulation time based at least in part on a voltage.

In another exemplary embodiment, a controller for a vehicle is provided. The controller includes a memory having computer readable instructions and a processing device for executing the computer readable instructions. The computer readable instructions control the processing device to perform operations for managing voltage in a low voltage bus of the vehicle. The operations include receiving an electrical load request for an electrical load of the vehicle. The operations further include, prior to enabling the electrical load, adjusting a voltage provided by a direct current (DC)/DC converter for a period of time based at least in part on the electrical load. The operations further include, responsive to expiration of the period of time, enabling or disabling the electrical load based at least in part on the electrical load request.

In addition to one or more of the features described herein, or as an alternative, further embodiments of the controller may include that the electrical load request is a request to enable the electrical load, and wherein adjusting the voltage provided by the DC/DC converter comprises increasing the voltage for the period of time prior to enabling the electrical load.

In addition to one or more of the features described herein, or as an alternative, further embodiments of the controller may include that the voltage is increased based at least in part on a minimum voltage threshold.

In addition to one or more of the features described herein, or as an alternative, further embodiments of the controller may include that the electrical load request is a request to disable the electrical load, and wherein adjusting the voltage provided by the DC/DC converter comprises decreasing the voltage for the period of time prior to disabling the electrical load.

In addition to one or more of the features described herein, or as an alternative, further embodiments of the controller may include that the voltage is decreased based at least in part on a maximum voltage threshold.

In addition to one or more of the features described herein, or as an alternative, further embodiments of the controller may include that at least one DC/DC converter converts an electrical power from substantially 100 volts, substantially 250 volts, substantially 400 volts, substantially 500 volts, substantially 650 volts, substantially 800 volts, or substantially 1000 to substantially 12 volts or substantially 48 volts.

In addition to one or more of the features described herein, or as an alternative, further embodiments of the controller may include that the electrical load request is triggered based at least in part on sensor data received from a sensor of the vehicle.

In addition to one or more of the features described herein, or as an alternative, further embodiments of the controller may include that the electrical load request is triggered based at least in part on sensor data received from a sensor of another vehicle.

In addition to one or more of the features described herein, or as an alternative, further embodiments of the controller may include that the DC/DC converter comprises a plurality of DC/DC converters that are connected in parallel at the low voltage bus.

In addition to one or more of the features described herein, or as an alternative, further embodiments of the controller may include that the period of time is a regulation time based at least in part on a voltage.

The above features and advantages, and other features and advantages, of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As described herein, a vehicle can include one or more electrical loads that are powered by one or more batteries. Some vehicles are equipped with low voltage batteries to provide electric power to some components, such as motors, lights, infotainment equipment, electronic control units, climate control systems, and/or the like, including combinations and/or multiples thereof.

At various times during operation of the vehicle, electrical loads may be enabled (e.g., turned on) or disabled (e.g., turned off). For example, an operator of the vehicle may desire to lower (e.g., "roll down") a window of the vehicle. To do this, the operator enables an electric motor via a switch to cause the window to lower. However, when the electric motor is enabled, the electric motor causes a transient load on the battery, which can result in a voltage and/or current drop. If the voltage drops too low (e.g., below a minimum threshold), other electrical systems/components on the low voltage bus may be negatively affected. Similarly, when an electrical load is disabled, a voltage and/or current spike may occur, which can also affect the vehicle.

One or more embodiments described herein address these and other shortcomings by providing for managing current or voltage in low voltage buses of vehicles to mitigate the effect of transient power loads and improve the response performance in auxiliary low voltage buses of vehicles. According to an embodiment, a controller of the vehicle manages a desired current reference or voltage reference prior to enabling or disabling a transient load. Loads can be enabled or disabled based on local or remote sensors in the vehicle.

Figure 1:
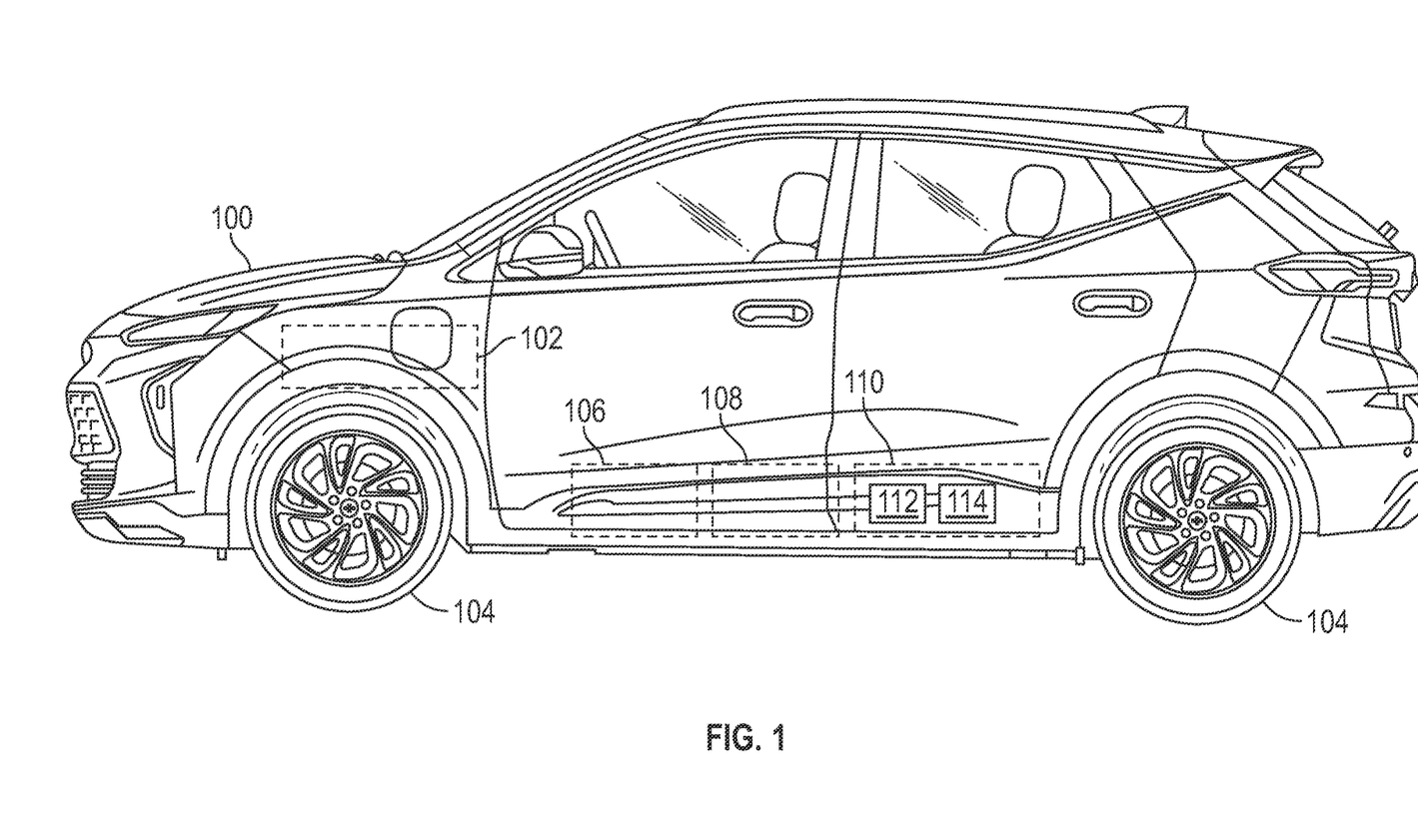
FIG. 1 shows a schematic illustration of a vehicle according to one or more embodiments described herein.

FIG. 1 shows a vehicle 100 according to one or more embodiments described herein. The vehicle 100 can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. In the example of FIG. 1, the vehicle 100 includes an internal combustion engine 102. The internal combustion engine 102 can be mechanically coupled to wheels 104 of the vehicle 100 to apply rotational force to the wheels 104, creating a driveline.

Figure 2A:
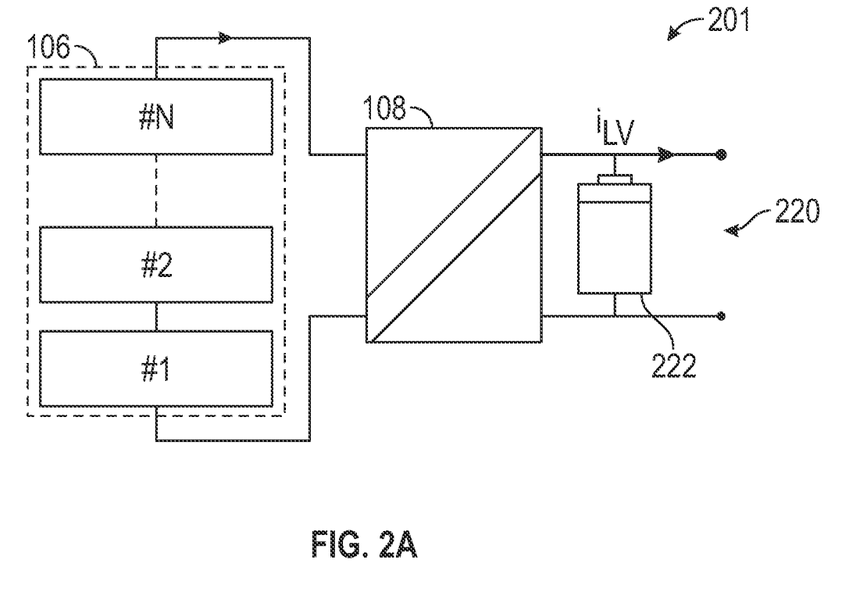
FIG. 2A shows a schematic illustration of a circuit for providing electrical power in a vehicle according to one or more embodiments described herein.
Figure 2B:
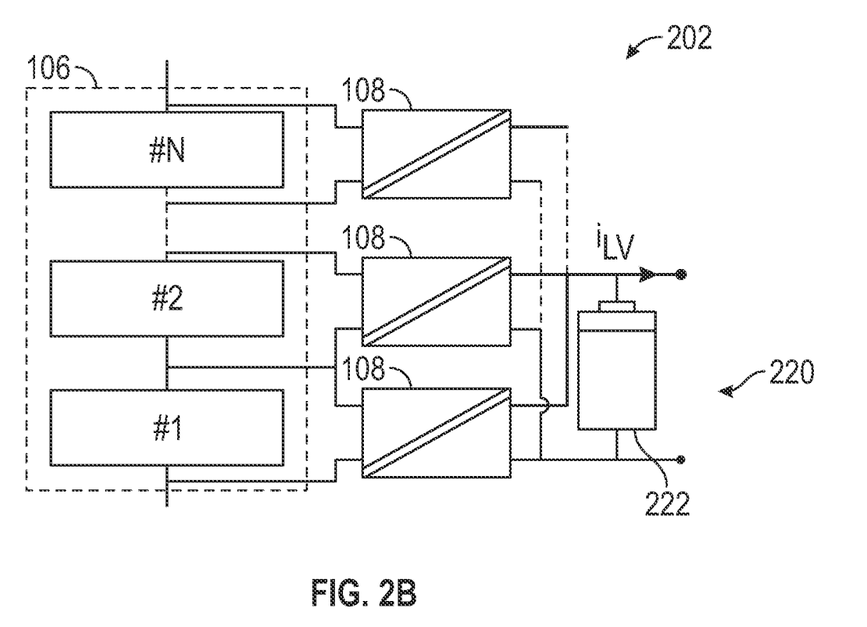
FIG. 2B shows a schematic illustration of a circuit for providing electrical power in a vehicle according to one or more embodiments described herein.
Figure 2C:
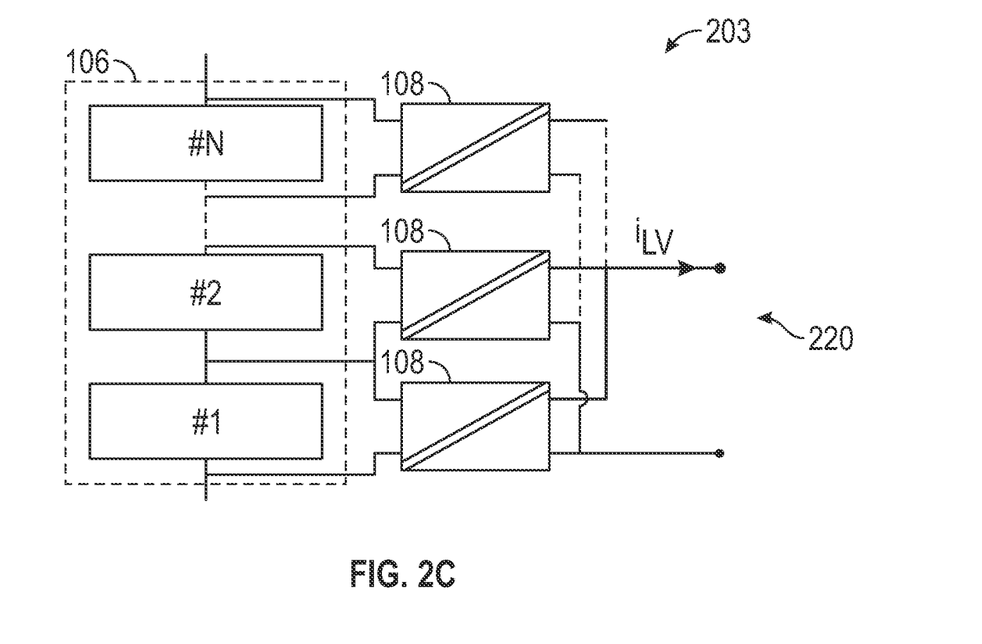
FIG. 2C shows a schematic illustration of a circuit for providing electrical power in a vehicle according to one or more embodiments described herein.
Figure 2D:
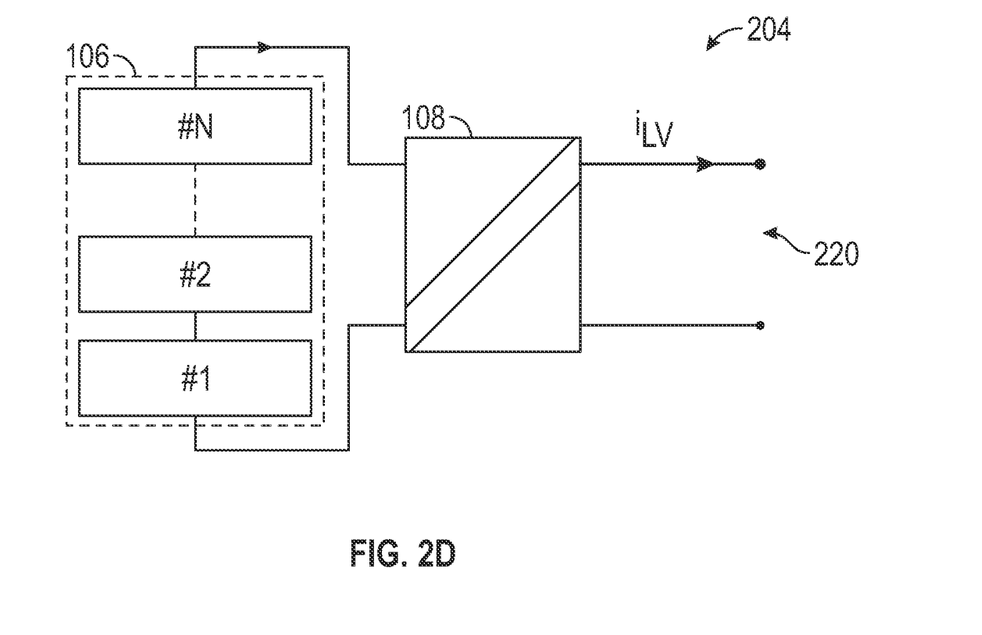
FIG. 2D shows a schematic illustration of a circuit for providing electrical power in a vehicle according to one or more embodiments described herein.

In some examples, a vehicle 100 can include one or more batteries 106 to provide electric power to electrical loads. Examples of electrical loads include electric motors, lights, infotainment equipment, electronic control units, climate control systems, and/or the like, including combinations and/or multiples thereof. According to one or more embodiments described herein, the one or more batteries 106 may provide substantially 100 volts of electric power, substantially 250 volts of electric power, substantially 400 volts of electric power, substantially 500 volts of electric power, substantially 650 volts of electric power, substantially 800 volts of electric power, substantially 1000 volts of electric power, and/or the like, including combinations and/or multiples thereof. This may be referred to as "high voltage" or "higher voltage." Some loads, like electric motors of electric vehicles used for propulsion, may operate at higher voltages. However, some loads, like lights and infotainment equipment, are referred to as "low voltage" loads or "lower voltage" loads and may operate at lower voltages. For example, low voltage loads may operate at substantially 12 volts, substantially 48 volts, and/or the like, including combinations and/or multiples thereof. To support these low voltage loads, the vehicle 100 can include a direct current (DC)/DC converter 108 to convert DC electric power, such as from a higher voltage to a lower voltage, in the vehicle 100, which is described in more detail with reference to FIGS. 2A, 2B, and 2C. The low voltage loads can be electrically connected to the DC/DC converter 108 by a low voltage bus (see, e.g., LV bus 220 of FIGS. 2A, 2B, and 2C) such that electric power is supplied to the low voltage loads at the low voltage.

The vehicle 100 can also include a controller 110. The controller 110 (e.g., also referred to as a "processing system") supports the management of electrical power through the vehicle 100. It is understood that one or more embodiments described herein is capable of being implemented in conjunction with any other type of computing environment now known or later developed. The controller 110 can include a processor 112, which may be one or more processing units and/or one or more multi-core processing units. In aspects of the present disclosure, each processing unit can include a reduced instruction set computer (RISC) microprocessor. As another example, the processor 112 can be a special-purpose processing device, such as application specific hardware, application specific integrated circuits (ASICs), application specific special processors (ASSPs), field programmable gate arrays (FPGAs), embedded controllers, hardwired circuitry, and/or the like, including combinations and/or multiples thereof. The processor 112 can be coupled to a memory 114, which can be any suitable type of memory device for storing data temporarily (e.g., random access memory (RAM)) and/or persistently (e.g., read only memory (ROM)). According to aspects of the present disclosure, managing current in low voltage buses of vehicles as described herein can be implemented using a combination of hardware and programming. The programming can be processor executable instructions stored on a tangible memory, and the hardware can include the processor 112 for executing those instructions. Thus a system memory (e.g., the memory 114) can store program instructions that when executed by the processor 112 can control low voltage buses in vehicles as described in more detail herein.

FIGS. 2A, 2B, 2C, and 2D are now described together. In particular, FIGS. 2A, 2B, 2C, and 2D show schematic illustrations of circuits 201, 202, 203, 204 respectively, for providing electric power in a vehicle according to one or more embodiments described herein.

Each of the circuits 201-204 includes the battery 106, which may be formed by one or more modules (e.g., module #1, module #2, . . . module #N). The battery 106 supplies electric power to one or more loads (not shown) connected to a low voltage (LV) bus 220 via at least one DC/DC converter 108. That is, each of the circuits 201-204 includes at least one DC/DC converter 108 to output electric power to the LV bus 220. In the examples of FIGS. 2A, 2B, 2C, and 2D, the electrical power is shown as a low voltage current iLV. Specifically, the circuits 201 and 204 include one DC/DC converter 108. The circuits 202 and 203 each include multiple DC/DC converters 108 (e.g., DC/DC converter #1, DC/DC converter #2, . . . DC/DC converter #N) configured and arranged as shown.

In some cases, the LV bus 220 can include a low voltage battery 222. For example, the circuits 201 and 202 include the low voltage battery 222 within the LV bus 220. However, the circuits 203 and 204 omit the low voltage battery 222, as shown.

The DC/DC converters 108 of the circuits 201, 202, 203, and 204 can be controlled, such as by the controller 110 of FIG. 1, to manage current or voltage in low voltage buses of vehicles according to one or more embodiments described herein.

Figure 3:
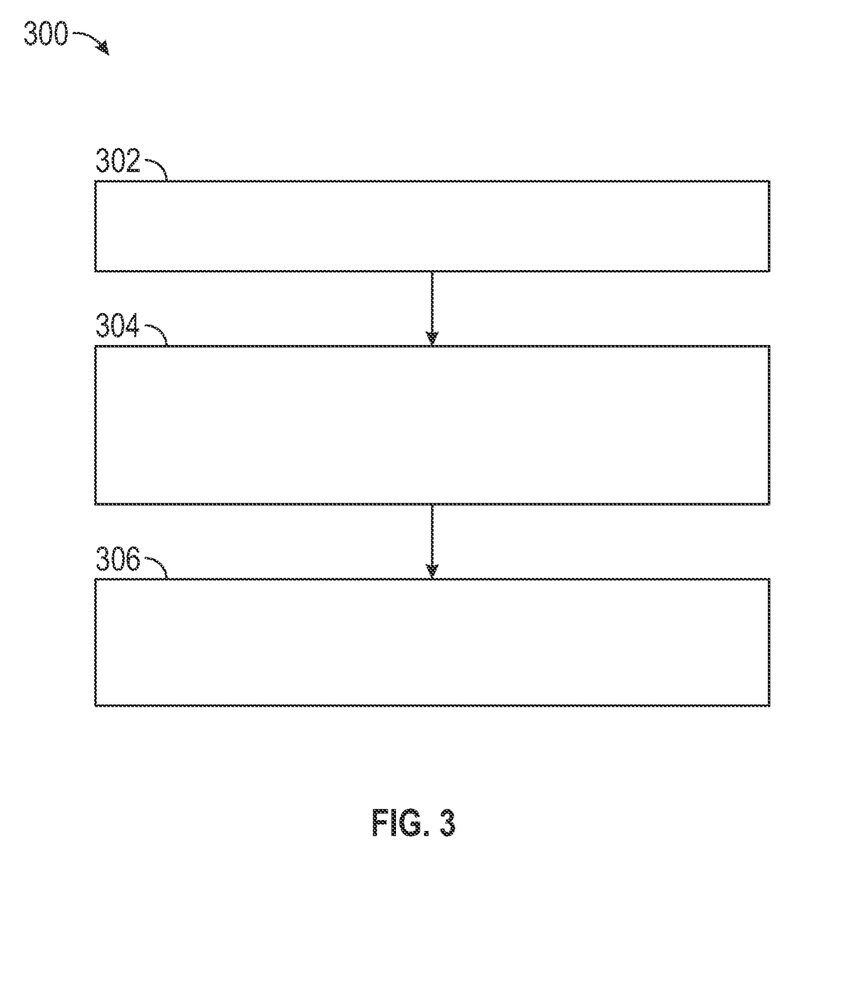
FIG. 3 shows a flow diagram of a method for managing current in low voltage buses of vehicles according to one or more embodiments described herein.

For example, FIG. 3 shows a flow diagram of a method 300 for managing current or voltage in low voltage buses of vehicles according to one or more embodiments described herein. The method 300 can be performed by any suitable system, controller, device, and/or the like, including combinations and/or multiples thereof. For example, the controller 110 can perform the method 300. The method 300 is now described in more detail with respect to FIGS. 1, 2A-2C, 4A, and 4B but is not so limited. Although the method 300 is described with respect to adjusting a current, the method 300 is not so limited because the techniques described herein for adjusting current can also be applied to adjust a voltage.

The method 300 starts at block 302, where the controller 110 receives an electrical load request for an electrical load of the vehicle. For example, an operator of the vehicle 100 may desire to lower (e.g., "roll down") a window of the vehicle 100. To do this, the operator enables an electric motor via a switch to cause the window to lower. The operator depressing or otherwise engaging the switch to lower the window acts as an electrical load request for an electrical load, in this case an electric motor that lowers/raises the window. According to one or more embodiments described herein, the electrical load request is triggered based at least in part on sensor data received from a sensor of the vehicle. For example, a camera (not shown) or moisture sensor (not shown) of the vehicle 100 and/or another vehicle can detect a rain condition and can enable windshield wipers accordingly.

At block 304, prior to enabling the electrical load, the controller 110 adjusts a current provided by a direct current (DC)/DC converter for a period of time based at least in part on the electrical load. Continuing with the window example from block 302, before the electric motor that lowers/raises the window is enabled to cause the window to lower, the controller 110 adjusts the current (e.g., the current iLV) to increase/decrease the current. This reduces the effect of transient loads (e.g., the electric motor of the window) by proactively increasing the current to account for the extra electric load that the electric motor of the window will introduce when it is enabled. Similarly, before the electric motor that lowers/raises the window is enabled to cause the window to lower, the controller 110 adjusts the low voltage bus to increase/decrease to account for the transient voltage drop/increase. In other words, a small time delay (e.g., a few microseconds, a few milliseconds, and/or the like) is added between the operator initiating lowering the window and the window being lowered. This small time delay is imperceptible to the operator but it is sufficient to reduce the effect of the transient load of the electric motor of the window.

Figure 4A:
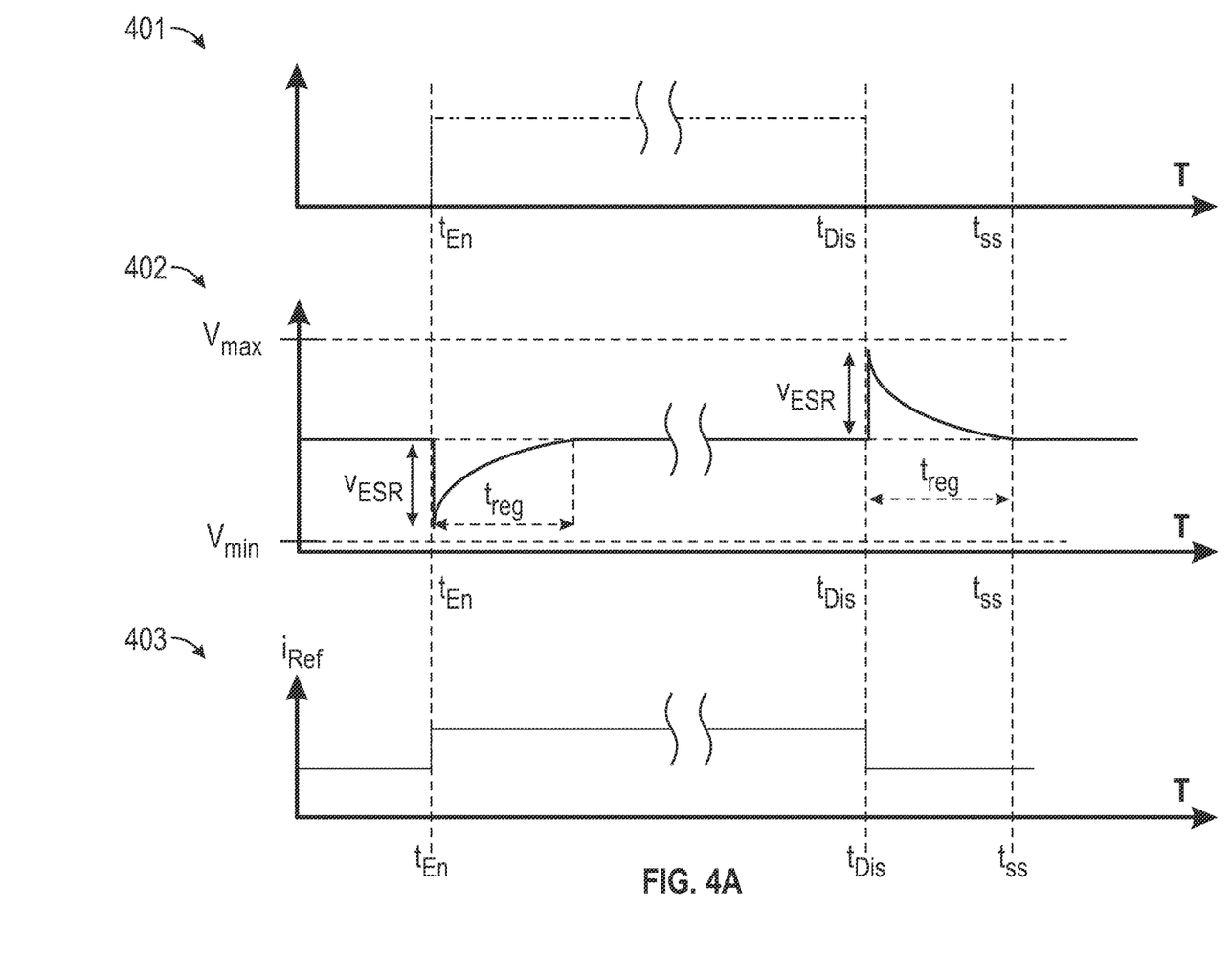
FIG. 4A shows graphs according to one or more embodiments described herein.
Figure 4B:
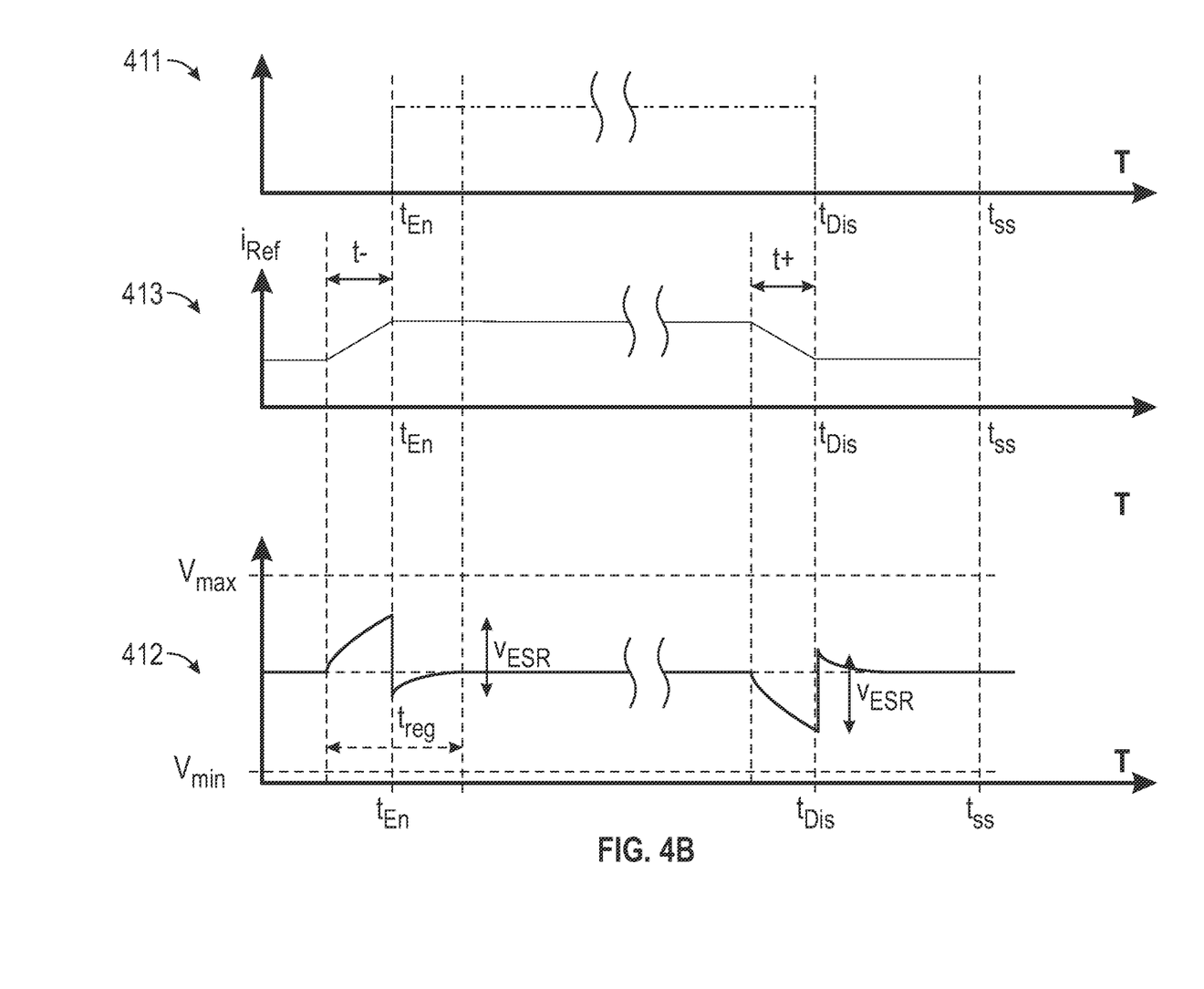
FIG. 4B shows graphs for managing current in low voltage buses of vehicles according to one or more embodiments described herein.

This can be seen in the example graphs of FIGS. 4A and 4B. FIG. 4A includes a load step graph 401, a bus voltage graph 402, and a current step graph 403. The graphs 401-403 of FIG. 4A are based on transient low voltage loads that are enabled/disabled without using the predictive approach to managing current in low voltage buses of vehicles according to one or more embodiments described herein.

Similarly, FIG. 4B includes a load step graph 411, a bus voltage graph 412, and a current step graph 413. Unlike FIG. 4A, the graphs 411-413 of FIG. 4B are based on transient low voltage loads that are enabled/disabled using the predictive approach to managing current in low voltage buses of vehicles according to one or more embodiments described herein.

As can be seen in the graphs 401-403 of FIG. 4A, when a transient load is enabled at time $t_{En}$, a reference current ($i_{ref}$) increases to supply current to the transient load. The reference current ($i_{ref}$) in this case represents the output of the DC/DC converter 108. This causes a voltage drop to occur (see graph 402) for a period of time, known as a regulation time ($t_{reg}$). Similarly, when a transient load is disabled at time $t_{Dis}$, the reference current ($i_{ref}$) decreases due to no longer supplying current to the transient load. This causes a voltage spike to occur (see graph 402) for the regulation time. In some situations, such as when multiple transient loads are enabled or disabled simultaneously or when a battery is failing (e.g., near the end of life cycle), the resulting voltage drop or spike can be problematic. For example, if the voltage drops below a minimum voltage threshold ($V_{min}$), the LV bus 220 may have insufficient electric power for the loads connected thereto, causing malfunctions or even walk-home faults. Similarly, if the voltage spikes above a maximum voltage threshold ($V_{max}$), electrical loads connected to the LV bus 220 may receive too much voltage, which can damage components or the entire electrical system of the vehicle.

These unwanted voltage spikes/drops can be avoided using the predictive approach to managing current in low voltage buses of vehicles described herein, as can be seen in FIG. 4B.

For example, in FIG. 4B, rather than enabling the transient load immediately upon receiving a request to initiate the transient load, the controller 110 causes the DC/DC converter 108 to increase the current prior to enabling the transient load. Particularly, the DC/DC converter 108 increases the current a period of time (t−) before enabling the transient load at time $t_{En}$. The period of time is based on the regulation time ($t_{reg}$), for example. That is, the period of time can be increased/decreased depending on an anticipated voltage drop/spike. As a result, it can be observed in the graph 412 that the voltage drop is reduced at time $t_{En}$ when the transient load is enabled. Similarly, the current is reduced a period of time (t+) before disabling the transient load at time $t_{Dis}$. This reduces the voltage spike at time $t_{Dis}$ as can be observed in the graph 412. It can further be observed (by comparing the graphs 402 and 412) that the resulting voltage spikes/drops at times tEn and tDis relative to the minimum voltage threshold (Vmin) and the maximum voltage threshold (Vmax), respectively, are reduced when using the predictive approach to managing current in low voltage buses of vehicles described herein.

With continued reference to the method 300 of FIG. 3, according to one or more embodiments described herein, in the case where the electrical load request is a request to enable the electrical load, adjusting the current provided by the DC/DC converter includes increasing the current for the period of time prior to enabling the electrical load. According to one or more embodiments described herein, in the case where the electrical load request is a request to disable the electrical load, and adjusting the current provided by the DC/DC converter includes decreasing the current for the period of time prior to disabling the electrical load.

In some cases, the current is increased or decreased based at least in part on a minimum voltage threshold or a maximum voltage threshold, respectively. For example, the current can be increased an amount that prevents a voltage drop below the minimum voltage threshold (Vmin). Similarly, the current can be decreased an amount that prevents a voltage spike above the maximum voltage threshold (Vmax).

At block 306, responsive to expiration of the period of time, the controller 110 enables or disables the electrical load based at least in part on the electrical load request.

Additional processes also may be included. For example, the techniques described in FIG. 3 can be used to adjust a voltage instead of or in addition to adjusting a current. It should be understood that the process depicted in FIG. 3 represents an illustration, and that other processes may be added or existing processes may be removed, modified, or rearranged without departing from the scope of the present disclosure.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for managing current in a low voltage bus of a vehicle, the method comprising:
   receiving an electrical load request for an electrical load of the vehicle;
   prior to enabling the electrical load, adjusting a current provided by a direct current (DC)/DC converter for a period of time based at least in part on the electrical load; and
   responsive to expiration of the period of time, enabling or disabling the electrical load based at least in part on the electrical load request.

2. The method of claim 1, wherein the electrical load request is a request to enable the electrical load, and wherein adjusting the current provided by the DC/DC converter comprises increasing the current for the period of time prior to enabling the electrical load.

3. The method of claim 2, wherein the current is increased based at least in part on a minimum voltage threshold.

4. The method of claim 1, wherein the electrical load request is a request to disable the electrical load, and wherein adjusting the current provided by the DC/DC converter comprises decreasing the current for the period of time prior to disabling the electrical load.

5. The method of claim 4, wherein the current is decreased based at least in part on a maximum voltage threshold.

6. The method of claim 1, wherein at least one DC/DC converter converts an electrical power from substantially 100 volts, substantially 250 volts, substantially 400 volts, substantially 500 volts, substantially 650 volts, substantially 800 volts, or substantially 1000 to substantially 12 volts or substantially 48 volts.

7. The method of claim 1, wherein the electrical load request is triggered based at least in part on sensor data received from a sensor of the vehicle.

8. The method of claim 1, wherein the DC/DC converter comprises a plurality of DC/DC converters.

9. The method of claim 1, wherein the period of time is a regulation time based at least in part on a voltage.

10. A method for managing current in a low voltage bus of a vehicle, the method comprising:
receiving an electrical load request for an electrical load of the vehicle, wherein the electrical load request is triggered based at least in part on sensor data received from a sensor of another vehicle;
prior to enabling the electrical load, adjusting a current provided by a direct current (DC)/DC converter for a period of time based at least in part on the electrical load; and
responsive to expiration of the period of time, enabling or disabling the electrical load based at least in part on the electrical load request.

11. A controller for a vehicle comprising:
a memory comprising computer readable instructions; and
a processing device for executing the computer readable instructions, the computer readable instructions controlling the processing device to perform operations for managing voltage in a low voltage bus of the vehicle, the operations comprising:
receiving an electrical load request for an electrical load of the vehicle;
prior to enabling the electrical load, adjusting a voltage provided by a direct current (DC)/DC converter for a period of time based at least in part on the electrical load; and
responsive to expiration of the period of time, enabling or disabling the electrical load based at least in part on the electrical load request.

12. The controller of claim 11, wherein the electrical load request is a request to enable the electrical load, and wherein adjusting the voltage provided by the DC/DC converter comprises increasing the voltage for the period of time prior to enabling the electrical load.

13. The controller of claim 12, wherein the voltage is increased based at least in part on a minimum voltage threshold.

14. The controller of claim 11, wherein the electrical load request is a request to disable the electrical load, and wherein adjusting the voltage provided by the DC/DC converter comprises decreasing the voltage for the period of time prior to disabling the electrical load.

15. The controller of claim 14, wherein the voltage is decreased based at least in part on a maximum voltage threshold.

16. The controller of claim 11, wherein at least one DC/DC converter converts an electrical power from substantially 100 volts, substantially 250 volts, substantially 400 volts, substantially 500 volts, substantially 650 volts, substantially 800 volts, or substantially 1000 to substantially 12 volts or substantially 48 volts.

17. The controller of claim 11, wherein the electrical load request is triggered based at least in part on sensor data received from a sensor of the vehicle.

18. The controller of claim 11, wherein the electrical load request is triggered based at least in part on sensor data received from a sensor of another vehicle.

19. The controller of claim 11, wherein the DC/DC converter comprises a plurality of DC/DC converters that are connected in parallel at the low voltage bus.

20. The controller of claim 11, wherein the period of time is a regulation time based at least in part on a voltage.

* * * * *